(12) United States Patent
Ironmonger et al.

(10) Patent No.: US 12,115,440 B2
(45) Date of Patent: Oct. 15, 2024

(54) INPUT APPARATUS FOR A COMPUTING SYSTEM

(71) Applicant: Ironburg Inventions Limited, Wincanton (GB)

(72) Inventors: Duncan Ironmonger, Milton, GA (US); Carl Jeffrey, Rochester (GB)

(*) Notice: Subject to any disclaimer, the term of this patent is extended or adjusted under 35 U.S.C. 154(b) by 283 days.

(21) Appl. No.: 17/766,367

(22) PCT Filed: Oct. 2, 2020

(86) PCT No.: PCT/GB2020/052431
§ 371 (c)(1),
(2) Date: Apr. 4, 2022

(87) PCT Pub. No.: WO2021/064418
PCT Pub. Date: Apr. 8, 2021

(65) Prior Publication Data
US 2023/0149803 A1    May 18, 2023

Related U.S. Application Data

(60) Provisional application No. 62/909,289, filed on Oct. 2, 2019.

(51) Int. Cl.
*A63F 13/22* (2014.01)
*A63F 13/235* (2014.01)
(Continued)

(52) U.S. Cl.
CPC ............ *A63F 13/22* (2014.09); *A63F 13/235* (2014.09); *A63F 13/24* (2014.09); *A63F 13/42* (2014.09)

(58) Field of Classification Search
CPC ........ A63F 13/22; A63F 13/235; A63F 13/24; A63F 13/42
See application file for complete search history.

(56) References Cited

U.S. PATENT DOCUMENTS 5,896,125 A    4/1999  Niedzwiecki
2006/0097453 A1*  5/2006  Feldman ............... A63F 13/218
273/304

(Continued)

OTHER PUBLICATIONS

International Searching Authority: International Search Report, App. No. PCT/GB2020/052431 (Nov. 16, 2020).

(Continued)

*Primary Examiner* — Omkar A Deodhar
*Assistant Examiner* — Shauna-Kay Hall
(74) *Attorney, Agent, or Firm* — Walters & Wasylyna LLC (57) ABSTRACT

The invention provides an input apparatus (110) for a computer. The input apparatus (110) comprises an outer case having a plurality of faces. A plurality of physical controls (101, 102, 103, 104, 105, 106, 107A, 107B, 107C, 108, 109) are located on one or more of the plurality of faces of the outer case for generating signals to control a computer application. The input apparatus (110) comprises microcontroller (150) configured to receive a first signal from a user input device (540) in communication with the input apparatus (110) in order to identify the input apparatus (110). The microcontroller (150) is configured to receive an input signal (550) from the user input device (540). The microcontroller (150) is further configured to translate the input signal (550) from the user input device (540) into a control function for the computer application and send a control signal (522) for the control function to the computer application.

20 Claims, 5 Drawing Sheets

(51) Int. Cl.
*A63F 13/24* (2014.01)
*A63F 13/42* (2014.01)

(56) References Cited

U.S. PATENT DOCUMENTS

| | | |
|---|---|---|
| 2010/0075756 A1 | 3/2010 | Roberts et al. |
| 2010/0153596 A1* | 6/2010 | Ye ............................ A63F 13/22 |
| | | 710/67 |
| 2010/0267454 A1 | 10/2010 | Navid |
| 2011/0081969 A1 | 4/2011 | Ikeda et al. |
| 2013/0012319 A1* | 1/2013 | Negroponte ............ A63F 13/92 |
| | | 463/37 |
| 2013/0281213 A1 | 10/2013 | Yasuda et al. |
| 2015/0105152 A1* | 4/2015 | Bellinghausen .... A63F 13/2145 |
| | | 463/31 |
| 2018/0056180 A1 | 3/2018 | Russell et al. |

OTHER PUBLICATIONS

"Bluetooth Basics—learn.sparkfun.com" (May 5, 2019) URL: https://web.archive.org/web/2019050202040/https://learn.sparkfun.com/tutorials/Bluetooth-basics/all.

* cited by examiner

INPUT APPARATUS FOR A COMPUTING SYSTEM

This application is the U.S. national stage entry under 35 U.S.C. § 371 of Intl. Pat. App. No. PCT/GB2020/052431 filed on Oct. 2, 2020, which claims priority from U.S. Ser. No. 62/909,289 filed on Oct. 2, 2019. The entire contents of Intl. App. No. PCT/GB2020/052431 and U.S. Ser. No. 62/909,289 are incorporated herein by reference.

FIELD

The present invention relates to an input apparatus for a computer, such as, but not limited to, a games console, a computing system, a cloud computing system, or a mobile computing system. More particularly, but not exclusively the invention relates to, a hand-held controller for computer gaming system, where the hand-held controller is capable of receiving and/or consolidating inputs from other devices and providing these inputs to the gaming system.

BACKGROUND

Controllers for most current games consoles or computing systems operating games are generally intended to be held and operated by the user holding the controller in both hands. Such controllers are sometime referred to as "gamepads". A conventional controller will generally comprise a hard, outer case with a plurality of controls mounted about the controller in close proximity. Typically, the controls include buttons, analogue control sticks, bumpers and triggers and are provided upon the front or the top of the controller, as well as additional controls on the back of the controller.

Such gamepads can be difficult to operate for younger users and/or users with various physical disabilities. Current solutions to address this issue require specialized input devices that physically connect to a central hub, or controller, which then provides an output to the gaming system on which the game is played. However, such solutions are cumbersome and expensive, requiring purchase of additional specialized input devices configured to operate with the hub. This adds complexity, unnecessary expense, and can result in an increased learning curve for users.

The present invention seeks to overcome or at least mitigate the problems of the prior art.

SUMMARY

Accordingly, apparatuses intended to address at least the above-identified concerns would find utility. This Summary provides in a simplified form some of the concepts and disclosure that are more fully described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An object of one or more of the present embodiments is to provide a controller that can be used by itself to operate a game or other computer program and can also receive inputs from a user's own separate devices to allow the user to implement any desired input mechanism or method to operate a game or other computer program.

According to a first aspect or embodiment, the present disclosure describes an input apparatus for a computer comprising an outer case having a plurality of faces including a front face, and a top face. The input apparatus may also comprise a plurality of physical controls located on the front face and the top face of the apparatus for generating signals to control a computer application. The apparatus may be shaped to be held in both hands of a user such that the user's thumbs are positioned to operate physical controls located on the front of the apparatus and the user's index fingers are positioned to operate physical controls located on the top of the apparatus. The input apparatus may further comprise a microcontroller configured to: receive a first signal from a user input device in communication with the input apparatus in order to identify the input apparatus, receive an input signal from the user input device, translate the input signal from the user input device into a control function for the computer application, and send a control signal for the control function to the computer application.

Optionally, the first signal and the input signal from the input apparatus are wireless. That is to say, the input apparatus and the user input device are free from physical connection to each other and employ a wireless data connection to transmit the first signal and the input signal "wirelessly".

Optionally, the first signal is received as part of an authentication process for the input apparatus.

Optionally, the control function replicates a function provided by one of the plurality of physical controls of the input apparatus.

Optionally, the control function is an additional function not provided by one of the plurality of physical controls of the input apparatus.

Optionally, the computer application is a game program.

Optionally, the computer application is executing or is configured to be executed on a separate computing device in communication with the input apparatus and the control signal is sent from the input apparatus to the separate computing device. The separate computing device may comprise one or more microprocessors to execute the computer application.

Optionally, the separate computing device is a games console.

Optionally, the separate computing device is a mobile or portable device.

Optionally, the input apparatus is in communication with the separate computing device via a communications network.

Optionally, the microcontroller is further configured to receive at least one assignment signal from the user input device and map the control function to the user input device.

Optionally, mapping the control function to the user input device comprises storing data associating the user input device with the control function.

Optionally, the data associating the user input device with the control function is stored on the input apparatus.

Optionally, the assignment signal comprises a plurality of assignment signals from the user input device each of the plurality of assignment signals comprising a separate activation of the user input device.

Optionally, mapping the control function to the user input device comprises storing data associating one of a plurality of control functions with each of the plurality of separate activations of the user input device.

Optionally, the user input device comprises an input controller incorporated into a separately operational apparatus.

Optionally, the separately operational apparatus comprises a wheelchair, bed, appliance, or machine.

Optionally, the user input device comprises a plurality of user input devices.

Optionally, the user input device comprises one or more of a gamepad, an appliance, a foot pedal, a joystick, a plurality of buttons, a virtual reality (VR device), or a kinetic device.

According to a second aspect or embodiment, the present disclosure describes an input apparatus comprising an outer case having a plurality of faces including a front face, and a top face. The input apparatus of the second aspect includes a plurality of physical controls located on the front face and the top face of the apparatus for generating signals to control a first computer application. The input apparatus of the second aspect is shaped to be held in both hands of a user such that the user's thumbs are positioned to operate physical controls located on the front of the apparatus and the user's index fingers are positioned to operate physical controls located on the top of the apparatus.

The input apparatus of the second aspect may further comprise a microcontroller configured to: receive a first signal from at least one user input device in communication with the input apparatus in order to identify the at least one input apparatus; generate assignment information for the at least one user input device, the assignment information mapping an activation of the at least one user input device to a control function for the first computer application; receive an input signal from the at least one user input device; determine whether to translate the input signal from the at least one user input device into the control function for the computer application; and responsive to the determination whether to translate, send a control signal to the first computer application.

Optionally, the first signal is an authentication signal.

Optionally, the first computer application is executed at the input apparatus.

Optionally, the first computer application is executed by the microcontroller of the input apparatus.

Optionally, the microcontroller is configured to store the assignment information on the input apparatus.

Optionally, determining whether to translate the input signal from the at least one user input device comprises determining whether assignment information for the input signal exists on the input apparatus.

Optionally, if the assignment information for the input signal exists on the input apparatus, the microcontroller is configured to translate the input signal in accordance with the assignment information and provide the control function in the control signal.

Optionally, if the assignment information for the input signal does not exist on the input apparatus, the microcontroller is configured to provide the input signal from the user input device in the control signal.

Optionally, generating the assignment information comprises receiving one or more assignment signals from the at least one user input device, each of the one or more assignment signals comprising a separate activation of the at least one user input device.

Optionally, generating the assignment information further comprises mapping one of a plurality of control functions with each of the one or more separate activations of the at least one user input device.

Optionally, generating the assignment information further comprises storing a first mapping of a first plurality of control functions with each of the separate activations of a first plurality of user input devices.

Optionally, generating the assignment information further comprises storing a second mapping of a second plurality of control functions with each of the separate activations of a second plurality of user input devices.

Optionally, generating the assignment information further comprises storing a second mapping of a plurality of second control functions with each of the separate activations of a first plurality of user input devices.

Optionally, the second mapping is associated with a second computer application different from the first computer application.

Optionally, the user input device comprises an input controller incorporated into a wheelchair, bed, appliance, or machine.

According to a third aspect or embodiment, the present disclosure describes an input apparatus for a computer. The input apparatus comprises an outer case having a plurality of faces. A plurality of physical controls is located on one or more of the plurality of faces of the outer case for generating signals to control a computer application. The input apparatus comprises a microcontroller configured to receive a first signal from a user input device in communication with the input apparatus in order to identify the input apparatus. The microcontroller is configured to receive an input signal from the user input device. The microcontroller is further configured to translate the input signal from the user input device into a control function for the computer application and send a control signal for the control function to the computer application.

According to a fourth aspect or embodiment, the present disclosure describes a module for a computer input apparatus comprising an interface for communicating with the computer input apparatus. The module comprises a microcontroller configured to receive a first signal from a user input device in communication with the input apparatus in order to identify the input apparatus. The microcontroller is configured receive an input signal from the user input device and translate the input signal from the user input device into a control function of the computer application.

Further features and advantages of the present invention will be apparent from the specific embodiments illustrated in the drawings and discussed below.

Within the scope of this application, it is envisaged or intended that the various aspects, embodiments, examples, features, and alternatives set out in the preceding paragraphs, in the claims, and/or in the following description and drawings may be considered or taken independently or in any combination thereof.

Features or elements described in connection with, or in relation to, one embodiment are applicable to all embodiments unless there is an incompatibility of features. One or more features or elements from one embodiment may be incorporated into, or combined with, any of the other embodiments disclosed herein, said features or elements extracted from said one embodiment may be included in addition to, or in replacement of one or more features or elements of said other embodiment.

A feature, or combination of features, of an embodiment disclosed herein may be extracted in isolation from other features of that embodiment. Alternatively, a feature, or combination of features, of an embodiment may be omitted from that embodiment.

BRIEF DESCRIPTION OF THE DRAWINGS

Exemplary embodiments of the invention will now be described with reference to the accompanying drawings, in which.

DETAILED DESCRIPTION

Detailed descriptions of specific embodiments of an input apparatus and a method are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the input apparatus, the controller, the additional control component and the method described herein may be embodied in various and alternative forms.

The Figures are not necessarily to scale, and some features may be exaggerated or minimized to show details of particular components. Well known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

A physical input device or controller such as a "gamepad" may be used by a user to provide inputs to a software application, such as a video game, operating on a computing device. Exemplary computing devices include but are not limited to, a games console, a computing system, a cloud computing system, or a mobile computing system. A game controller or other physical controller may be shaped and sized to fit an average user hand. Similarly, the input mechanisms for such game controllers (e.g., buttons, triggers, bumpers, thumbsticks, directional pads, etc.) are also usually created or implemented to fit the average user hand. However, users may have differing hand sizes and/or differing physical ability to operate the input mechanisms of the game controller. For example, users with physical disabilities may be unable to operate all (or any) of the input mechanisms of a standard game controller.

The present disclosure is directed to a physical controller of any shape, referred to generically herein as an "input apparatus," that allows different users to operate the physical controller and/or provide inputs to the input apparatus using any desired user mechanism that can communicate with the input apparatus. In an embodiment, the input apparatus is configured to communicate wirelessly with, and accept input signals from, any desired user mechanism in order to provide control signals to a computing system on which a game or other application is executing. In an embodiment the game or other application may be operating on the input apparatus (e.g., the computing system executing the game may be incorporated into the input apparatus).

In some implementations, one or more user mechanisms may be used to replicate control functionality provided by physical controls of the input apparatus, such as one or more buttons, thumbsticks, direction pad (D-pad), etc., of the input apparatus. In such implementations, inputs from the user mechanism may be used instead of (or in addition to) the corresponding control mechanism on the input apparatus. For example, a separate joystick in communication with the input apparatus may be manipulated by a user to provide the control functions normally provided by a thumbstick or D-pad of the input apparatus.

In other implementations, the user mechanism may be used to provide additional functionality beyond the control functions provided by the physical controls of the input apparatus. In such implementations, inputs from the user mechanism may be used in addition to the control mechanisms (such as buttons, thumbsticks, D-pad, etc.) to provide additional functionality to that provided by the control mechanisms of the input apparatus. For example, a foot pedal in communication with the input apparatus may be manipulated by a user to provide the control functions normally provided by a trigger of the input apparatus, or to provide an additional control function not available by use of the input apparatus by itself.

Figure 1A:
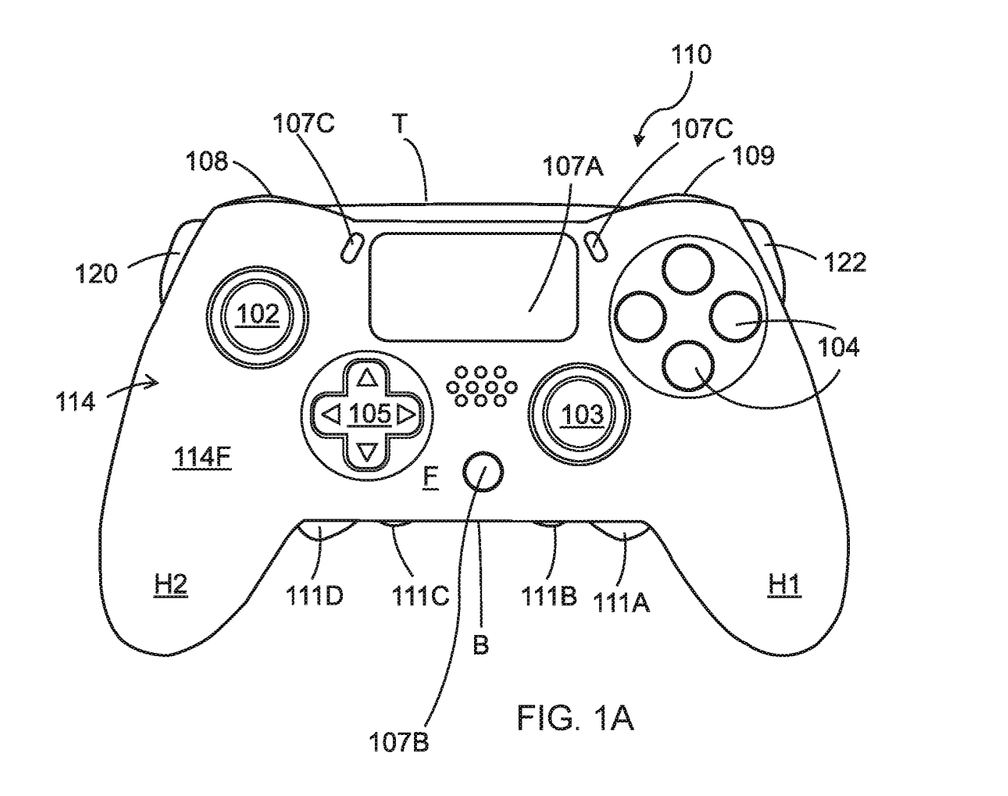
FIG. 1A is a schematic illustration of the front of an input apparatus, such as for a games console controller, according to an embodiment of the subject matter disclosed by the present disclosure.

The concepts described by present disclosure are adaptable or usable for any type or shape of physical controller input apparatus. Referring to FIG. 1A, there is shown a plan view from above of the front of an exemplary input apparatus 110 in which the present concepts may be implemented. The input apparatus 110 illustrated in FIG. 1A is one example of a physical controller and the present disclosure is equally applicable to other physical controllers, including physical controllers with more or fewer features or input mechanisms than those shown in FIG. 1A and/or discussed herein. The input apparatus 110 illustrated takes the form of a controller 110 or gamepad 110 for use with a video games console or similar. In other embodiments the input apparatus 110 may take the form of a handheld games console or other mobile device such as but not limited to a smartphone, tablet computer, phablet or the input apparatus 110 may be an accessory device (such as, but not limited to, a sleeve or case) for use with such a mobile device.

The exemplary apparatus or controller 110 comprises an outer case or shell 114. The case 114 may comprise one or more panels fitted together and or mounted to a chassis member. The case 114 may comprise a front body panel 114F and a rear body panel 114B (see FIG. 1B). The outer case 114 comprises a void in which electronic components (such as, but not limited to, a microprocessor, switches, and/or sensors) are located. The apparatus or controller 110 comprises a plurality of controls, which are mounted to the front "F" and to the top "T" of the controller 110. As used herein the term "front" refers to an upper surface of the controller 110 when in normal use held in both hands, whilst the term "top" refers to a leading edge of the controller 110, which typically faces away from a user when held in both hands. A rear or back "R" of the controller opposes the "front" and typically will form a lower surface, whilst the term "bottom" or "B" refers to a trailing edge of the controller 110, which typically faces towards the user when held in both hands. The controller 110 comprises a plurality of buttons, which, when activated, initiate a specific action or control function. The controller 110 comprises at least one omnidirectional control stick or button, which is operable to provide directional input.

The example controller 110 of FIG. 1 comprises first, left, and second, right, analogue control sticks, also known as thumb sticks 102, 103. The first left 102 and second right 103 thumb sticks normally control movement and are intended to be operated by a typical user's left and right thumbs respectively. Left and right thumb sticks 102, 103 are mounted to or extend from the front face F of the controller 110. The left thumb stick 102 is located in a forward (or upper i.e. nearer the top T of the controller 110) left region of the front face F; and right thumb stick 103 is located in a rearward (or lower i.e. nearer the bottom B of the controller 110) right region of the front face F. In other embodiments, other configurations of the thumb sticks 102, 103 are possible.

Additionally, there are four buttons 104, located on a forward (or upper i.e. nearer the top T of the controller 110) right portion of the front face F of the controller 110. The four buttons 104 normally control additional actions and are intended to be operated by the user's right thumb. There is a direction pad 105 located on the rearward (or lower) left portion of the front face F of the controller 110. The direction pad 105 is intended to be operated by the user's left thumb, typically either as an alternative to the left thumb stick 102 or to provide additional action controls for a software application, such as a game. A left shoulder button or bumper 108 and a right shoulder button or bumper 109 are located on the top face T of the controller 110.

Figure 1B:
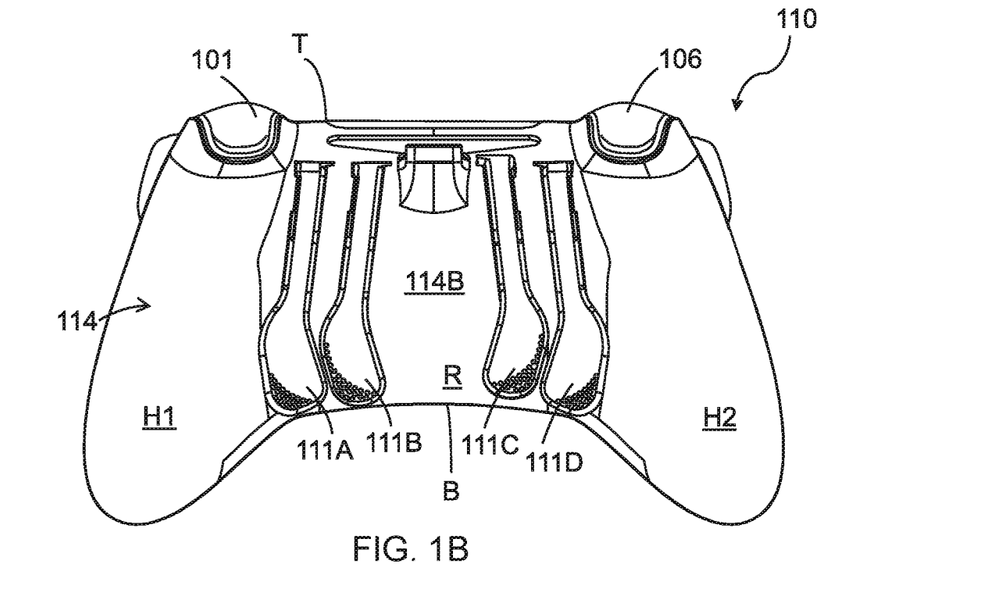
FIG. 1B is a plan view from below of the rear of the input apparatus of FIG. 1A, the apparatus comprising additional controls mounted thereto.
Figure 2A:
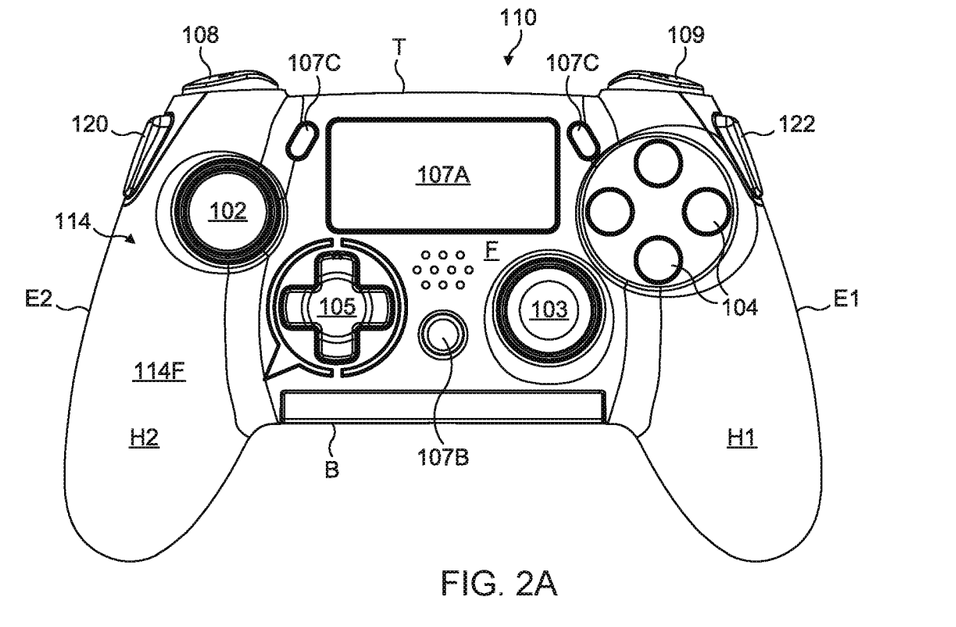
FIG. 2A is a perspective view from above of the front of an input apparatus of FIG. 1A.
Figure 2B:
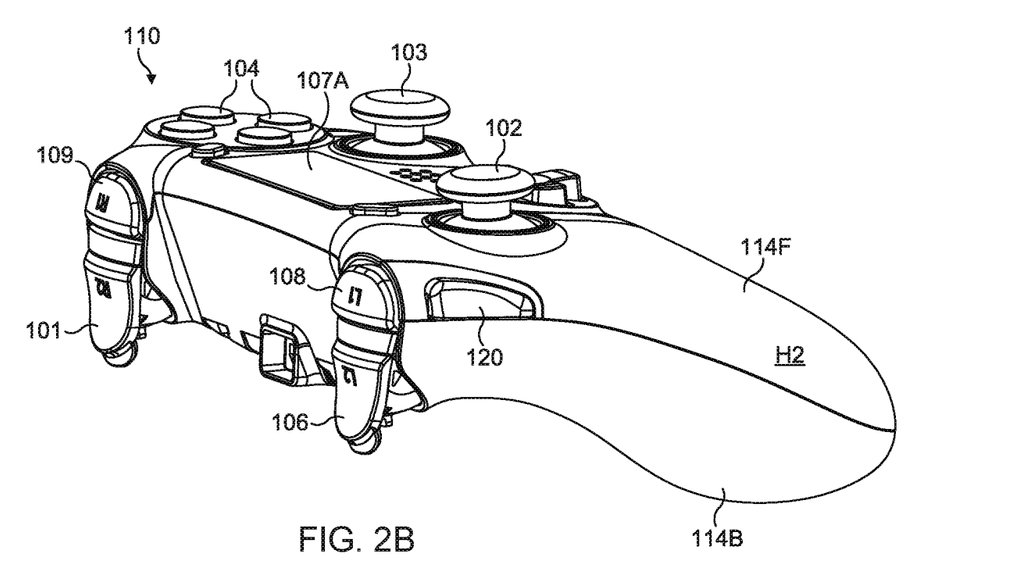
FIG. 2B is an alternative perspective view the input apparatus of FIG. 1A.
Figure 3A:
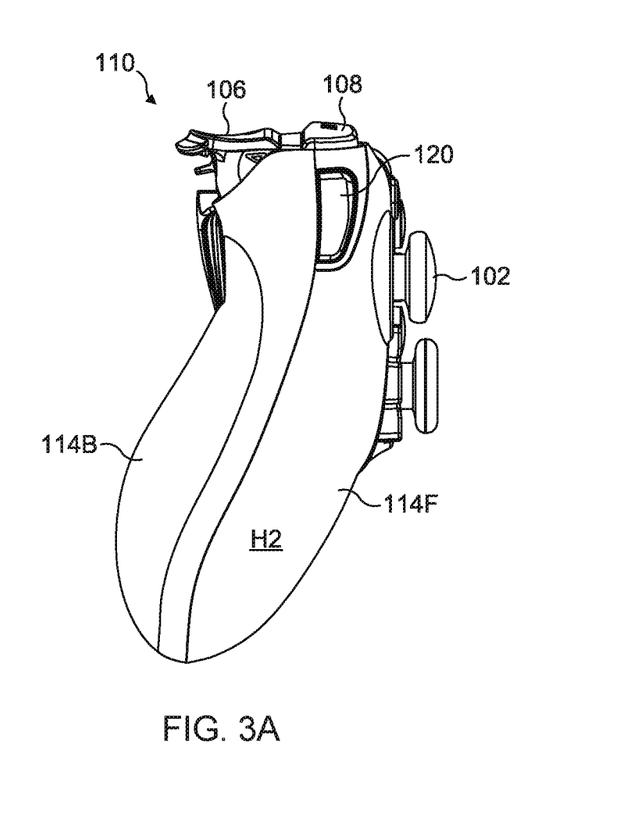
FIGS. 3A and 3B are first and second side views, respectively, of the input apparatus shown in FIGS. 1A and 1B.
Figure 3B:
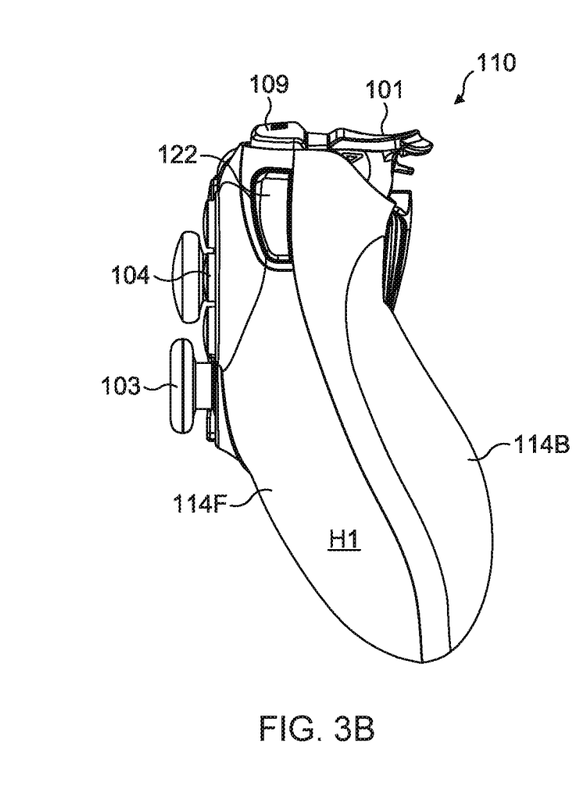
Figure 4:
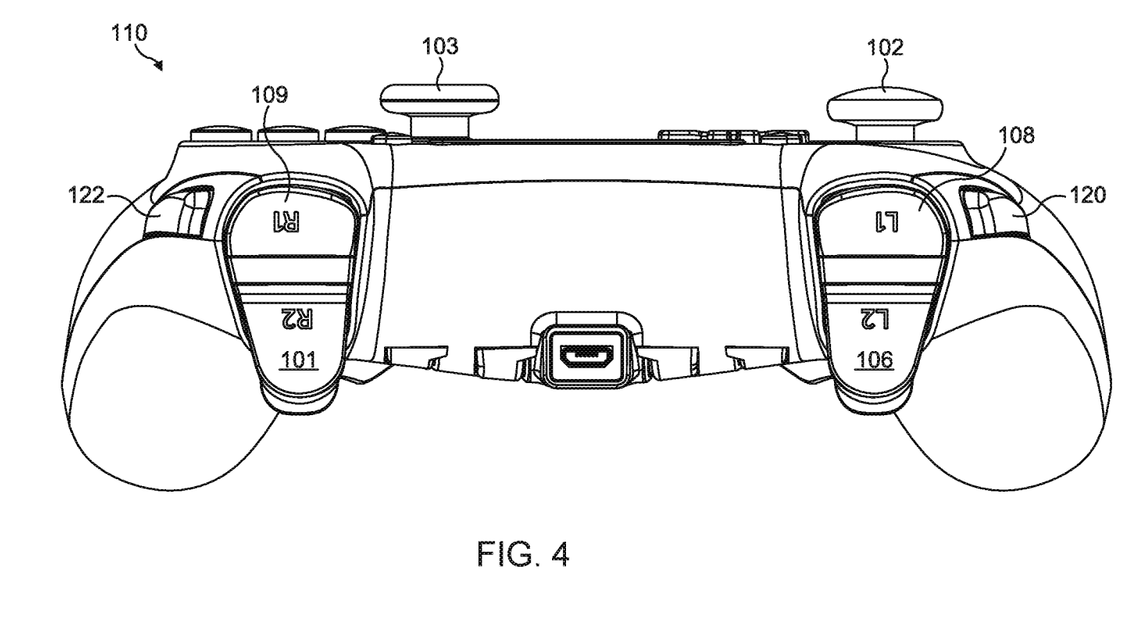
FIG. 4 is a top view top of the input apparatus of FIG. 1A.

A left trigger 106 and a right trigger 101 are also located on the top face T of the controller 110 (see FIG. 1 B). The left and right triggers 106, 101 are typically operated by a user's index fingers. The left and right bumpers 108, 109 may also be operated by a user's index fingers. The left and right triggers 106, 101 may be analogue or digital in nature, and in some embodiments may comprise a plurality of discrete states, that is to say, the input control may be dependent upon the degree of depression or displacement of the trigger body. The controller 110 may comprise one or more additional input buttons 107A, 107B, 107C, the buttons 107A, 107B, 107C may take the form of one or more digital or analogue buttons or may be in the form of a touch pad or touch screen.

In order to operate any of the buttons 104, a user will normally remove their thumb from the right thumb stick 103 so as to depress one or more of the buttons 104. Switching between the right thumb stick 103 and the buttons 104 takes time since the user's thumb must traverse the distance therebetween. Similarly, the direction pad 105 is typically operated by the user removing their left thumb from the left thumb stick 102 in order to operate the direction pad 105. To alleviate the need to move the user's thumbs, the controller 110 may comprise one or more additional controls 111A, 111B, 111C, 111D mounted to the rear "R" or back of the apparatus 110, where the rear R or back face is opposite the top face F (the face F to which the buttons 104, left and right thumb sticks 102, 1 03 and direction pad 105 are mounted).

In the illustrated apparatus 110, the apparatus comprises four additional controls 111A, 111B, 111C, 111D. In other embodiments, more or fewer additional controls 111A, 111B, 111C, 111D may be provided. The additional controls 111A, 111B, 111C, 111D, also referred to herein as back controls. Each back control may comprise an elongate member, that is to say, the member comprises a first end and a second end the distance between the first and second ends is greater than a width of the member. The member may be bent, twisted or folded in one or more directions. The back controls 111A, 111B, 111C, 111D may be orientated such that at least a portion of the member is substantially parallel with respect to one of a first and second handle portions H1, H2 of the controller 110. In such embodiments, the back controls are each positioned to be operable by the middle, ring or little fingers of a user. These are the fingers normally used to grasp first and second handle portion H1, H2 which thus brings them into proximity with the rear face R of the controller 110.

As will be understood, other configurations and/or placements of back controls on the controller 110 are possible, including back controls that are oriented differently than illustrated (such as entirely or partially horizontally oriented), that are of a different type than illustrated (such as buttons, differently shaped paddles, etc.), or that are integrated into the casing of the back B of the controller 110 (such as a flexible portion of the back cover or a capacitive switch or other mechanism integrated into or with the back cover).

The exemplary controller 110 may include further actuators or additional controls, such as additionally controls 120, 122 illustrated in FIG. 1A as located on the side walls E1, E2 of the controller case 114 proximate the top or leading edge T of the controller 110. Such additional controls 120, 122 may be disposed in an upper region of the side walls E1, E2 of the controller case 114, that is to say, proximate the front F of the controller 110. The illustrated additional control 120, 122 are arranged to be operated by a user engaging or pressing the control with one of the phalanges of the index finger preferably the user's proximal phalanx or middle phalanx.

The additional control 120 may replicate the function operated by either the left shoulder button 108 or left trigger 106. The additional control 120 may replicate the function of one of the controls disposed on the front of the controller 110 for example, but not limited to, buttons 104. The additional control 122 may replicate the function operated by either the right shoulder button 109 or right trigger 101. The additional control 122 may replicate the function of one of the controls disposed on the front of the controller 110 for example, but not limited to, buttons 104. Alternatively, the additional controls 120, 122 may control one or more new command functions. As will be understood, other configurations and/or placements of additional controls 120, 122 on the controller 110 are possible, including controls that are oriented differently than illustrated (such as entirely or partially horizontally oriented), that are of a different type or shape than illustrated (such buttons, differently shaped controls, etc.), or that are integrated into the casing of the controller 110 (such as a flexible portion of the cover or a capacitive switch integrated into or with the cover).

Each of the buttons 104, buttons 107, back controls 111, and/or additional controls 120, 122 of the controller 110 may be configured to activate a corresponding electronic input sensor of the controller 110, to generate an activation signal responsive to being manipulated or depressed. Additionally, thumb sticks 102, 103 may be configured to provide an input that is based on a position of the thumb stick relative to a default "center" position (such as through a potentiometer), as well as an activation signal responsive to being depressed towards the front F of the outer case 114. The triggers 101, 106 may be configured in some embodiments to provide a varying activation signal based on a position of the trigger relative to a default position or may in other embodiments be configured to provide an on/off activation signal similar to buttons 104 as discussed above. Finally, the D-pad 105 may be configured to rest in a default position when no force is applied, and to move from the default position to one or more selected activation positions in response to a touch applied to the D-pad 105. The selected activation positions may each generate a different activation signal, or a combination of activation signals, by activating different electronic input sensors.

The input apparatus 110 also includes an integrated processor or microcontroller configured to receive activation signals from the plurality of physical controls discussed above and send control signals corresponding to the activation signals to a computing device in communication with the input apparatus 110 and/or to send control signals corresponding to the activation signals to an application or game executing on the input apparatus 110. The control signals operate to control (or provide inputs to) an application, such as a game, executing on one or more of the input apparatus 110 or the computing device (which computing device may be in direct connection with input apparatus 110, or may be indirectly coupled to the input apparatus, such as through a network such as the internet).

The integrated microprocessor may be configured to map (or re-map) activation signals generated from different physical controls of the input apparatus 110 to different functions or control signals communicated to the computing device. For example, the microprocessor may be configured to cause activation of back control 111A to generate a control signal corresponding to an activation of a button 104 (or any other desired physical control). In this manner, the microprocessor may allow the functionality provided for the executing application by activation of one physical control (such as a button 104), or a combination of physical controls to be provided by an activation of a different physical control (such as back control 104).

Figure 5:
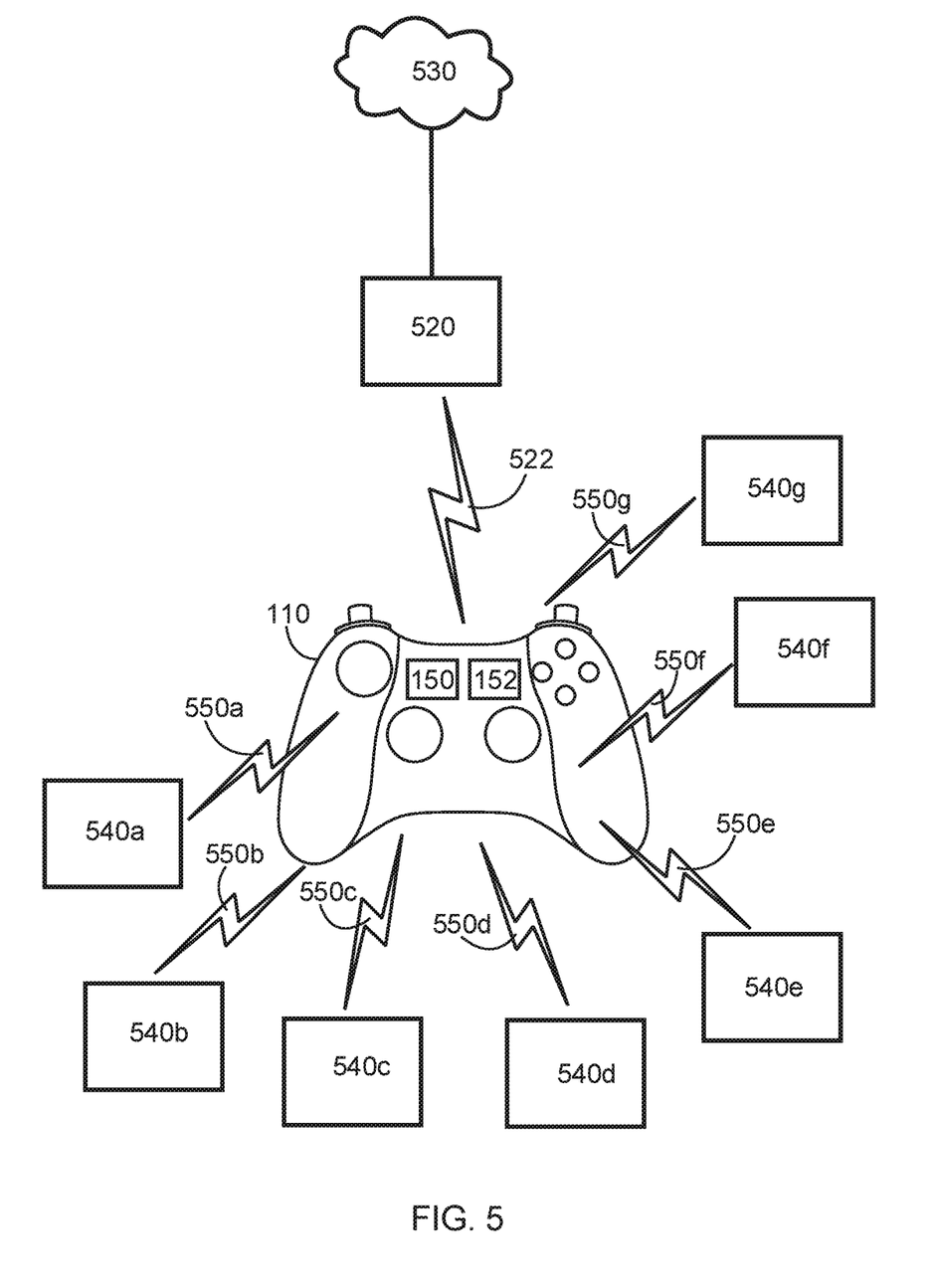
FIG. 5 illustrates an embodiment of an input apparatus, such as the input apparatus of FIG. 1A, receiving inputs from other devices used to control a computer program.

FIG. 5 illustrates an embodiment of an input apparatus, such as the input apparatus 110 of FIG. 1A, receiving input signals 550 from user devices 540. The input apparatus 110 includes a microprocessor such as integrated microcontroller 150. Microcontroller 150 is configured to translate the various input signals 550 into one or more control signals 522, used to control or operate a computer program, such as a game. In an embodiment, the game or other program may be executing on a computing system 520 separate from but in communication with the input apparatus 110, such as illustrated in FIG. 5. Computing system 520 in one implementation may be a gaming console separate from the input apparatus 110, in which case the control signals 522 may be communicated from the input apparatus 110 through a direct, wired, or wireless connection to the computing system 520.

In other embodiments, the input apparatus 110 may communicate the control signals 522 through a wired or wireless connection to a remotely located computing system 520 executing the game or other program, such as a cloud-based computing system (not illustrated) coupled to the input apparatus 110 via a network such as the internet 530. In yet other embodiments, some or all of the game or other program may be executing on the input apparatus 110 itself in which case at least some of the control signals 522 will be internal to the input apparatus 110.

As illustrated in FIG. 5, one or more user devices 540 may communicate via input signals 550 with input apparatus 110, which signals may be received by a communications interface (CI) 152 that is part of, or in communication with, microcontroller 150. The input signals 550 may be wireless and may comprise any desired method or protocol such as Bluetooth, Near-field communication (NFC), Wi-Fi, Zigbee, Z-Wave, etc., to allow communication with the CI 152 or input apparatus 110.

The user devices 540 may be any mechanism that a user can operate or manipulate, and that is capable of communicating via input signals 550 with input apparatus 110. Such user devices 540 may be stand-alone input devices such as joysticks, buttons or collections of buttons, foot pedals, computer mice, entirely separate gamepads (such as prior generation gamepads or gamepads designed to operate with a different computer than computing system 520), a virtual reality (VR) device, a kinetic device, a gesture recognition device, an electroencephalography (EEG) or similar device that measures brain electrical activity such as an EEG headset, or a special purpose device designed to accommodate a physical disability. Although six user devices 540 are illustrated in FIG. 5, more or fewer user devices 540 may be implemented as desired by a user.

Alternatively, or additionally, the user devices 540 may in some embodiments comprise input devices incorporated into another mechanism, such as an input mechanism for an appliance or machine, or even a blow tube, joystick, mouth control, or other input device incorporated into a wheelchair or hospital-style bed. In such embodiments, input apparatus 110 allows a user to implement any input device or mechanism with which the user is already familiar or proficient to perform game controls and/or control any software application executing on computer system 520. As long as the user device 540 can communicate with input apparatus 110 (or can be adapted to communicate with input apparatus 110), the user device 540 can be used to replicate the functions provided by the physical controls of input apparatus 110 (or to provide additional controls other than those allowed by the physical controls of input apparatus 110).

In an embodiment, each desired user device 540 may be coupled to the input apparatus 110 through an authentication or handshake process. As part of this process, the input apparatus 110 may ensure communications can be received with each user device 540, and it is not necessary that each user device 540 communicate with the input apparatus using the same communication protocol. For example, one or more of signals 550a-550f may be a Bluetooth signal, while one or more of such signals 550a-550f may be an NFC signal, or may be a Zigbee signal or other communication protocol signal.

An exemplary authentication process could include entering the input apparatus 110 into a programming or "pairing" mode, such as by engagement of a dedicated "pairing" button, switch or control (not illustrated) on the input apparatus 110 before receiving or while receiving signals 550a-550f, by using a separate signal (whether electrical or magnetic) to the input apparatus 110 to place the input apparatus 110 into the programming or pairing mode, via an application operating on the computing system 520, etc. In an embodiment such exemplary authentication process could be performed after the input apparatus 110 is itself authenticated to and/or paired with the computing system 520, or as part of the authentication of the input apparatus 110 to the computing system 520.

As each user device 540 is coupled to or paired with the input apparatus 110 (or after each desired user device 540 has been coupled to or paired with the input apparatus 110), information about each user device 540 may be established or stored, either on input apparatus 110, computing system 520, or elsewhere. The established or stored information may be automatically gathered from the user device 540 (either during or after the authentication/handshake process), may be entered or provided by the user, or may be a combination of both. Such information about the user device 540 may include identification information about each user device 540 coupled to the input apparatus 110. In an embodiment, identification information may be stored in order to ease future connections, to establish "profiles" for one or more user, or for any other purpose.

The established or stored information about the user device 540 may also include input information about the number and types of inputs that the user device 540 provides or is able to provide. In an embodiment, such input information may be gathered or determined automatically by input apparatus 110 communicating with the user devices 540. In such embodiments, the identification information about a user device 540 may also include the input information. While in other implementations, the input information may be determined by the input apparatus 110 based in whole or in part on the identification information for the user device 540, such as from a table stored on input apparatus 110 or elsewhere.

In other embodiments, the input information may be determined or gathered from the user activating the desired inputs of each user device 540. For example, if user device 540a is a 4-direction joystick, input information corresponding to each of the 4 possible inputs that may be received as signal 550a from activation of user device 540a may be stored. Similarly, if user device 540b is a tongue control for a wheelchair, input information corresponding to each of the possible inputs that may be received as signal 550b from activation by the user may be stored.

In an implementation, this input information about the number and types of inputs of the user device 540 may be part of a set-up or calibration process for each user device 540 where the user is prompted to or may select to activate each input of the user device 540 that the user intends to use for game control or to provide control inputs. Such prompting or selecting of each input for the user devices 540 may be accomplished for example via a user interface of an application executing on a computer such as computing device 520, or through the input apparatus 110 itself. It is not necessary that a user elect to use every input signal possible for each user device 540.

The established or stored information about the user device 540 may also include assignment information about which physical control(s) of the input apparatus 110 and/or which control functions for the game or application being controlled should be activated by each input signal from the user devices 540. This assignment information may be gathered, established, or stored when identifying the number and types of inputs for each user device 540 as discussed above, or may be gathered, established, or stored after the input information has been determined. Continuing with the above example, if user device 540a is a 4-direction joystick, assignment information about which control signal should be assigned to each of the 4 possible inputs from activation of user device 540a may be stored as assignment information.

Such assignment of control function to the activation inputs from the user devices 540 to generate the assignment information may be accomplished by any desired means. In an embodiment, such assignment information may be generated by or on the input apparatus 110, such as by placing the input apparatus 110 in a programming mode or pairing mode and causing the assignment through some combination of activating each input signal of the user device 540 and the physical control to which each input signal is to be assigned.

The input apparatus 110 may be placed in the programming or pairing mode by any desired means, such as by an application operating on the computing device 520 with which the input apparatus 110 is connected, by activating a control or button on the input apparatus 110, or by other means. Additionally, the assignment information may be generated as part of the authentication process discussed above. For example, in some embodiments, the authentication process may be a multi-step process with steps including, but not limited to: connecting, pairing, or authenticating the input apparatus 110 to the computing system 520, coupling or pairing one or more user device 540 to the input apparatus 110, and creating the assignment information for the activation inputs for the one or more user device(s) 540.

In an embodiment, the assignment information may be generated by or on some computer other than the input apparatus 110, such as computing device 520. In such embodiments, an application operating on the computer may additionally, or alternatively be used to assign each input signal of user device 540 to the desired control function. Some or all of the assignment information may be stored on the input apparatus 110, the computing device 520, another computer, or any combination thereof.

It is not necessary that a single input of a user device 540 be mapped or assigned to a single control function. For example, a "left" activation of 4-direction joystick used as user device 540a may be mapped to one control function for the game (such as the control function assigned to moving thumbstick 102 left), while "left" activation of the same joystick of user device 540a when a button of user device 540b is also activated may be mapped to a different control function for the game if desired. Similarly, in an example where user device 540b comprises a plurality of buttons, pressing a first button may be mapped or assigned to one control function, pressing a second button may be mapped or assigned to a second control function, and pressing the first and second button together may be mapped or assigned to a third control function. Other examples and combinations of activations of the user devices 540 are possible.

Additionally, the assignment information may be stored multiple times and/or stored in association with multiple different "profiles." For example, in a first profile the 4-direction joystick of user device 540a may be assigned to replicate the inputs of the left thumbstick (102 in FIG. 1A), while in a second profile the 4-direction joystick of user device 540a may instead be assigned to replicate the inputs of the right thumbstick (103 in FIG. 1A), and in a third profile the 4-direction joystick of user device 540a may be assigned to provide additional control functions different from/beyond those possible with the physical controls of input apparatus 110.

In an embodiment, the exemplary first, second, and third profiles discussed above may be associated with different users. In other embodiments, the exemplary first, second, and third profiles may be associated with the same user to provide different options for that user, e.g. the first profile for a first type or style of game, the second profile for a second type of game, and the third profile for a third type of game or for a non-gaming application.

Note that each of these exemplary first, second, and third profiles may also include different or varying numbers or combinations of user devices 540 and the inputs of each user device 540 may be mapped or assigned to a different desired control functions in each profile as desired. For example, the exemplary first profile may include user device 540a as discussed above as well as user devices 540b, 540c, and 540d, while the exemplary second profile may include user device 540a as discussed above along with user devices 540b, 540d, 540e, and 540f, or any other desired combination.

In the above example, user device 540d present in both first and second profiles may have its inputs assigned or mapped to different control functions in the different profiles or may have its inputs assigned to the same control functions in the different profiles as desired. The use of three profiles is by way of example and more or fewer profiles are possible. Additionally, each profile and/or the assignment information may be changed, including by re-mapping or re-assigning the activations of one or more user device 540 to a different control function, changing the combination of user devices 540 for a profile, changing the communication protocol to use for one or more user devices 540, etc.

Where such profiles have been created with the stored information, the selection of a particular profile for use may be made by any desired method. In an embodiment a profile may be selected by the user, such as by activation of a physical control on the input apparatus 110 or selection of the profile through a user interface in an application executing on the computing device 520 or on another computer (including the input apparatus 110). In another embodiment, the profile may be selected by automatically, such as by a determination made by the input apparatus 110, computing system 520, or other computer. Such determination may include determining which user devices 540a are present and in communication with the input apparatus 110 at a given time, what game/application or type of game/application is to be controlled, what communication protocols are available/preferred, a combination thereof, or using any other desired factors or parameters.

During operation, such as when a game is executing on computing system 520, the desired or applicable user devices 540 may be used instead of, or in addition to, the physical controls of the input apparatus 110 to provide control signals 522 to control or operate the game. When the user activates a user device 540, an input signal 550 corresponding to the user's activation is transmitted from the user device 540 and received by the input apparatus 110, such as at control interface 152.

In an embodiment, the input apparatus 110 translates the received input signal 550 into assigned control input for the game and transmits a control signal 522 to provide the assigned control input for controlling the game. As discussed the control signal 522 may be internal to the input apparatus 110 if the game or other program is operating on the input apparatus 110, or may be external via direct, wired, or wireless signals if the game or other program is operating in whole or in part on a processor or computer external to the input apparatus 110, such as computing device 520. Where the translation occurs at input apparatus 110, the translation is performed by microcontroller 150 and may be based on assignment information and/or other information stored on input apparatus 110 (such as in a table) or stored elsewhere and received by input apparatus 110.

In other embodiments, input apparatus 110 may not translate the received input signal 550 but may instead pass on the input signal 550 to the computing system 520 via control signal 522. In such embodiments, the computing system 520 may perform any needed translation of activation of the user device 540 into the assigned control function for the game. The translation by the computing system 520 may be based on assignment information and/or other information stored on the computing system 520 (such as in a table) or elsewhere.

In yet other embodiments, the translation of an input signal 550 from a user device 540 may be performed by either of input apparatus 110 or computing device 520, and where the translation occurs may be based on a determination. For example, where the translation occurs may depend on any desired factor such as which user device 540 is providing the input signal, which profile has been selected, which communication protocols or methods are being implemented, whether or not the assigned control function is a replication of a physical control of input apparatus 110 or an additional control function not provided by the physical controls of input apparatus 110, etc.

For example, in one implementation, input signals 550a-550c from user devices 540a-540c may be translated by input apparatus 110, while input signals 550d-550f from user devices 540d-540f may be passed on by input apparatus 110 and translated by computing device 520. In another exemplary implementation, input signals 550 received by input apparatus 110 that are determined to be assigned to a physical control of input apparatus are translated by input apparatus 110, while input signals 500 that are determined not be assigned to a physical control of (or that are not recognized by) input apparatus 110 are passed on and translated by computing device 520.

Regardless of how and where the translation is performed, the translated input signals 550 from one or more of user devices 540 may then be used to control the game or other application, whether executing on input apparatus 110 or on another processor or computer, such as computing device 520.

It is envisaged that the input apparatus 110 of FIG. 5 may be coupled to a games console or computer such as computing device 520 by a wired connection or by a wireless connection device. It is also envisaged that the input apparatus 110 may be constructed as a shell or caddy into which a handheld electronic device such as, but not limited to, a mobile telephone (smartphone) or tablet computer is inserted, the caddy comprising control actuators, thumb sticks and/or buttons (which are coupled to the electronic device either wirelessly or via physical or wired connection) for interaction with or control of the electronic device.

It is envisaged that the input apparatus 110 of FIG. 1A may be provided with a module comprising the microcontroller 150 or the communications interface 152 or both the microcontroller 150 and the communications interface 152. In this way a games controller 110 or other input apparatus 110 may be retrofitted with the functionality to communicate with and interpret signals from one or more user devices 540. The module may comprise an interface for communicating with the input apparatus 110. In such embodiments the module may comprise a transceiver for communicating with the module, control signals 522 between the input apparatus and the computing system 520 may be carried out by a separate or existing transceiver within the input apparatus 110. The module may be mounted to or within the input apparatus 110. In some embodiments the module is detachably mounted to the input apparatus 110. In such embodiments the interface may take the form of an electrical connector.

It will be recognized that, as used herein, directional references such as "top," "bottom," "front," "back," "end," "side," "inner," "outer," "upper," and "lower" do not limit the respective features to such orientation, but merely serve to distinguish these features from one another.

The invention claimed is:

1. An input apparatus for a computer, the input apparatus comprising:

an outer case having a plurality of faces including:
a front face, and
a top face;
a plurality of physical controls located on the front face and the top face of the apparatus for generating signals to control a computer application;
the apparatus being shaped to be held in both hands of a user such that the user's thumbs are positioned to operate physical controls located on the front of the apparatus and the user's index fingers are positioned to operate physical controls located on the top of the apparatus; and
a microcontroller configured to:
receive a first signal from a user input device in communication with the input apparatus in order to identify the user input device, wherein identifying the user input device includes identifying at least one input control signal the user input device is capable of providing,
receive the input control signal from the user input device,
translate the input control signal from the user input device into a control function for the computer application, and
send an output control signal for the control function to the computer application.

2. An input apparatus according to claim 1, wherein the first signal and the input control signal from the user input device are wireless.

3. An input apparatus according to claim 1, wherein the first signal is received as part of an authentication process for the user input device.

4. An input apparatus according to claim 1, wherein the control function replicates a function provided by one of the plurality of physical controls of the input apparatus.

5. An input apparatus according to claim 1, wherein the control function is an additional function not provided by one of the plurality of physical controls of the input apparatus.

6. An input apparatus according to claim 1, wherein the computer application is a game program.

7. An input apparatus according to claim 1, wherein the computer application is executing on a separate computing device in communication with the input apparatus and the output control signal is sent from the input apparatus to the separate computing device.

8. An input apparatus according to claim 7, wherein the separate computing device is a games console.

9. An input apparatus according to claim 7, wherein the separate computing device is a mobile device.

10. An input apparatus according to claim 7, wherein the input apparatus is in communication with the separate computing device via a network.

11. An input apparatus according to claim 1, wherein the microcontroller is further configured to receive at least one assignment signal from the user input device and map the control function to the user input device based on the assignment signal.

12. An input apparatus according to claim 11, wherein mapping the control function to the user input device comprises storing data associating the user input device with the control function.

13. An input apparatus according to claim 12, wherein the data associating the user input device with the control function is stored on the input apparatus.

14. An input apparatus according to claim 12, wherein mapping the control function to the user input device comprises storing data associating one of a plurality of control functions with each of the plurality of separate activations of the user input device.

15. An input apparatus according to claim 11, wherein the assignment signal comprises a plurality of assignment signals from the user input device each of the plurality of assignment signals comprising a separate activation of the user input device.

16. An input apparatus according to claim 1, wherein the user input device comprises an input controller incorporated into a separately operational apparatus.

17. An input apparatus according to claim 16, wherein the separately operational apparatus comprises a wheelchair, bed, appliance, or machine.

18. An input apparatus according to claim 1, wherein the user input device comprises a plurality of user input devices.

19. An input apparatus comprising:
an outer case having a plurality of faces including:
a front face, and
a top face;
a plurality of physical controls located on the front face and the top face of the apparatus for generating signals to control a first computer application;
the apparatus being shaped to be held in both hands of a user such that the user's thumbs are positioned to operate physical controls located on the front of the apparatus and the user's index fingers are positioned to operate physical controls located on the top of the apparatus; and
a microcontroller configured to:
receive a first signal from at least one user input device in communication with the input apparatus in order to identify the at least one user input device, wherein identifying the at least one user input device includes identifying at least one input control signal the user input device is capable of providing,
generate assignment information for the at least one user input device, the assignment information mapping an activation of the at least one user input device to a control function for the first computer application,
receive the input control signal from the at least one user input device,
determine whether to translate the input control signal from the at least one user input device into the control function for the computer application, and
responsive to the determination whether to translate, send an output control signal to the first computer application.

20. An input apparatus for a computer, the input apparatus comprising:
an outer case having a plurality of faces;
a plurality of physical controls located on one or more of the plurality of faces of the outer case for generating signals to control a computer application; and
a microcontroller configured to:
receive a first signal from a user input device in communication with the input apparatus in order to identify the user input device, wherein identifying the user input device includes identifying at least one input signal the user input device is capable of providing,
receive the input signal from the user input device,
translate the input signal from the user input device into a control function for the computer application, and send an output control signal for the control function to the computer application.

\* \* \* \* \*